(12) United States Patent  
Tsao

(10) Patent No.: US 9,098,526 B1  
(45) Date of Patent: * Aug. 4, 2015

(54) SYSTEM AND METHOD FOR WIRELESS DEVICE ACCESS TO EXTERNAL STORAGE

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,106

(22) Filed: Jan. 8, 2014

Related U.S. Application Data

(63) Continuation of application No. 14/079,831, filed on Nov. 14, 2013, which is a continuation of application No. 10/726,897, filed on Dec. 4, 2003, now Pat. No. 8,606,880.

(51) Int. Cl.
*G06F 15/16* (2006.01)
*G06F 17/30* (2006.01)

(52) U.S. Cl.
CPC ............................. *G06F 17/30194* (2013.01)

(58) Field of Classification Search
USPC .......... 709/219, 203, 226, 220, 200; 455/412, 455/899
See application file for complete search history.

(56) References Cited

U.S. PATENT DOCUMENTS

| | | | |
|---|---|---|---|
| 8,606,880 B2 * | 12/2013 | Tsao | 709/219 |
| 2001/0052073 A1 * | 12/2001 | Kern et al. | 713/161 |
| 2002/0104080 A1 * | 8/2002 | Woodard et al. | 717/176 |
| 2002/0133597 A1 * | 9/2002 | Jhingan et al. | 709/228 |
| 2003/0072031 A1 * | 4/2003 | Kuwata et al. | 358/1.15 |
| 2004/0033821 A1 * | 2/2004 | Slesak et al. | 455/575.1 |
| 2004/0186750 A1 * | 9/2004 | Surbey et al. | 705/4 |
| 2014/0089360 A1 * | 3/2014 | Tsao | 707/827 |

* cited by examiner

*Primary Examiner* — El Hadji Sall

(57) ABSTRACT

To meet the needs for storing larger volume personal information for user of wireless device, it is desire to provide extra storage space to the wireless device such as for cell phone or personal assistant device (PDA) etc due to the limited storage space that the wireless device has. Instant application disclosed a system and method for the wireless device to efficiently and effectively use remotely located storage space provided by a server for storing message or multimedia data such as videos, digital music, digital photo/picture.

20 Claims, 5 Drawing Sheets

Wireless devices supports in a simple environment

Wireless devices supports in a simple environment

SYSTEM AND METHOD FOR WIRELESS DEVICE ACCESS TO EXTERNAL STORAGE

CROSS REFERENCE TO PRIOR APPLICATION

This invention is a continuation application of the U.S. patent application Ser. No. 14/079,831 filed on Nov. 14, 2013 and now a U.S. Pat. No. 8,868,690, which in turn itself is a continuation application of U.S. patent application Ser. No. 10/726,897 filed on Dec. 4, 2003 and now a U.S. Pat. No. 8,606,880, which is referenced to a prior application No. 60/401,238 of "Concurrent Web Based Multi-task Support for Control Management System" filed on Aug. 6, 2002 and converted to application Ser. No. 10/713,904 which now is an U.S. Pat. No. 7,418,702. This application also referenced to an prior application No. 60/402,626 of "IP Based Distributed Virtual SAN" filed on Aug. 12, 2002 and converted to application Ser. No. 10/713,905 which now is an U.S. Pat. No. 7,379,990. All mentioned prior applications are herein incorporated by reference in their entirety for all purpose.

FIELD OF THE INVENTION

This invention focuses on how a wireless device can actually use external storage provided by a storage server.

BACKGROUND INFORMATION

Terminology:
The terminologies described in next few sections reflect the scope and are part of present invention.
The Internal Storage of a System:
The storage media such as hard disk drives, memory sticks, memory etc. is connected to a system directly through bus or a few inches of cable. Therefore, the storage media actually is a component of the system in an enclosure.
The External Storage of a System:
The external storage media is not a component of the system in a same enclosure. Therefore, they have to be connected through a connecting medium (e.g. a cable) such as Ethernet cable for IP based storage, Fiber channel cable for fiber channel storage, or such as wireless medium and etc. The storage media of an external storage could be magnetic hard disk drives, solid state disk, optical storage drives, memory card, etc. and could be in any form such as Raid which usually consists of a group of hard disk drives.
The Storage Partition, its Volumes, and the Corresponding File System:
To effectively use storage system, each storage device usually needs to be partitioned into small volumes. After the partition, each of the volumes can be used to establish a file system on it. To simplify the discussion herein, the term of the storage volume, its corresponding file system, and the term of the partition of the storage device are often used without differentiation.
CCDSVM:
It is an abbreviation for a central controlled distributed scalable virtual machine system. The CCDSVM allows a control management station to control a group of systems and provide distributed services to a client system on the Internet, the Intranet, and an LAN environment.
ISP & ASP:
The ISP refers to Internet service provider and the ASP refers to application service provider.

FIGURES

FIG. 1 illustrates an embodiment of the instant application, the FIG. 1 is the same as FIG. 1 of the prior application of the "Concurrent Web Based Multi-task Support for Control Management System" with an exception of replacing a console host with a wireless device.

FIG. 2 is the same as FIG. 1 of the above except that it shows a more detailed storage system controlled by a server. In addition, multiple wireless devices are presented for access to the storage system.

FIG. 3 shows a scheme of a wireless device downloading contents from an ISP/ASP or other web sites to an external storage allocated for the wireless device.

FIG. 4 is similar to the FIG. 1 of the prior application of the "IP Based Distributed Virtual SAN" with exception that each IP storage server provides file system as external storage for each of the wireless devices instead of providing IP based virtual SAN service. Also, each host in said FIG. 1 actually is replaced by a wireless device of FIG. 4.

Unless specified, the programming languages and the protocols used by each software modules of instant application, and the computing systems used in this invention are assumed to be the same as described in the mentioned prior patent applications.

In addition, in the drawing, like elements are designated by like reference numbers. Further, when a list of identical elements is present, only one element will be given the reference number.

BRIEF DESCRIPTION OF THE INVENTION

Today users commonly face a problem of lack of storage capacity configured on their wireless devices such as cell phone or PDA, which are usually limited to 256 MB for the PDA and much less for the cell phone. To effectively solve this problem and let users own multiple gigabytes (GB) of storage for their wireless devices as well as allowing the users to use the GB storage for their multimedia applications, the storage of a server can be used as the external storage for the wireless devices. This technology has been briefly introduced in the prior patent applications.

Now let us examine how can the external storage actually be used by the wireless devices. First, let each server unit (e.g. the server 3 of the FIG. 2) partitions its storage system into volume and each of the volumes will have multiple GB in size. Therefore, each user of the wireless devices can be exclusively assigned for access to a specific storage volume on a server unit. For example, if we need to provide each user a 4 GB storage space, then a 160 GB disk drive can support 40 users. Therefore, a 4096 GB storage system on the server unit can support a total of 1024 the users. Further, any data on a wireless device of a user can be transmitted to an assigned storage volume. In addition, the user of the wireless device also can download multimedia data from an ISP or ASP to the assigned storage volume in a designated server unit through out-band approach shown in FIG. 3. Finally, for one embodiment, the user can use a web-browser, which has a functionality of invoking embedded video or music, to enjoy his/her stored multimedia contents.

These and other futures, aspects and advantages of the present invention will become understood with reference to the following description, appended claims, and accompanying figures.

Figure 1:
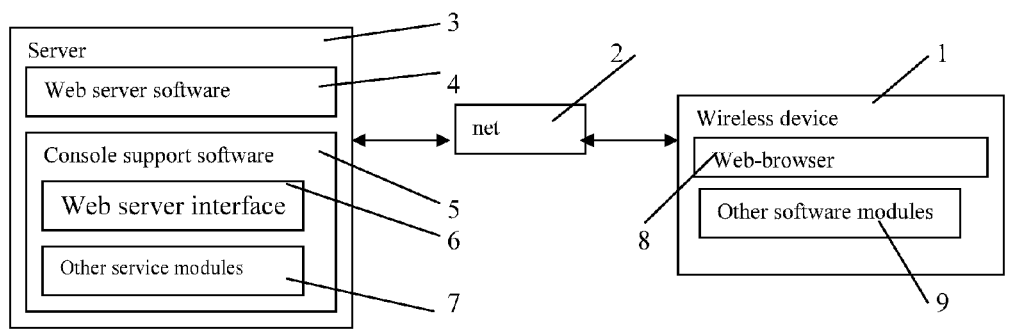
Referring now to FIG. 1, which demonstrates an example of an infrastructure comprising a network interconnecting a wireless device and a server. In the FIG. 1, Net (2) represents a communication link, which may be combined with wireless and wired connection media and guarantee that the communication packets can be sent/received between the wireless device and the server. It is also assumed that the net (2) representing a communication infrastructure is built up in such way that a user of a wireless device can access and browse any web-site on the Internet, the Intranet.

In the FIG. 1, the console support software (5) on the server (3) can be configured to support web-based multi-tasks for a user of the wireless device (1) using a web browser 8. Further, the user of the wireless device is facilitated to perform creating structured layered file directories or folders, and perform data management operations, such as delete, move, copy, rename for data files or folders/directories and etc. on an assigned storage volume configured in the server (3).

In addition, the other software modules (9) of the wireless device (1) is also configured capable to send data to or receive data from the other service modules (7) running on the server (3) via communication link (2) through a suitable IP or non-IP based protocol. The data being sent or received cold be a digital photo picture, a message etc., in respect to a user's request.

Also, the console supporting software (5) of the server (3) and the other software modules (9) of the wireless device (1) can be implemented with any suitable languages such as C, C++, Java, etc. depending on the implementation.

Besides, the web-browser (8) of the wireless device (1) can be any suitable software, which. is capable to communication with web server software (4) on the server (3) or with any other web server through the HTTP protocol.

Figure 2:
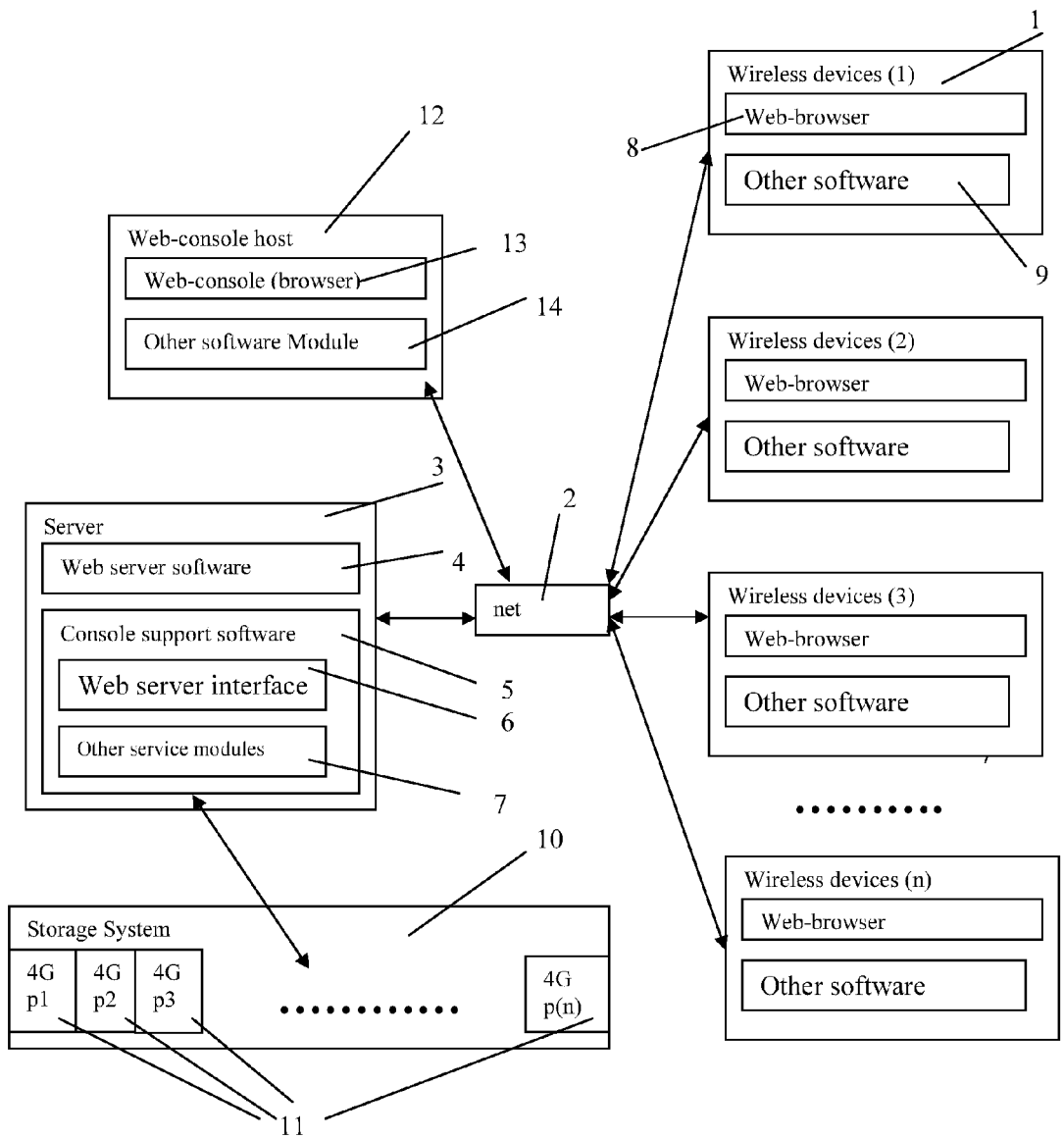

On the other hand, FIG. 2 has demonstrated that the storage system (10) of a server 3 can be allocated to multiple wireless devices as followings: First, the storage system (10) of the server (3) can be partitioned into multiple storage volumes (11) by administration staff through a web-console (13) of a console host (12).

Second, the storage system (10) of the server (3) can be partitioned in such way that a user of each of the wireless devices can be assigned with a storage volume having a desired size, so that the server 3 can support maximum numbers of the wireless devices.

In addition, the storage connection media could be any kind of cables, such as SCSI cable, IP cable, Fiber cable etc. or could be wireless communication media. The storage system itself could be various types.

Finally, the storage system (10) can be accessed by each of the wireless devices through IP or non-IP based network and protocols.

Figure 3:
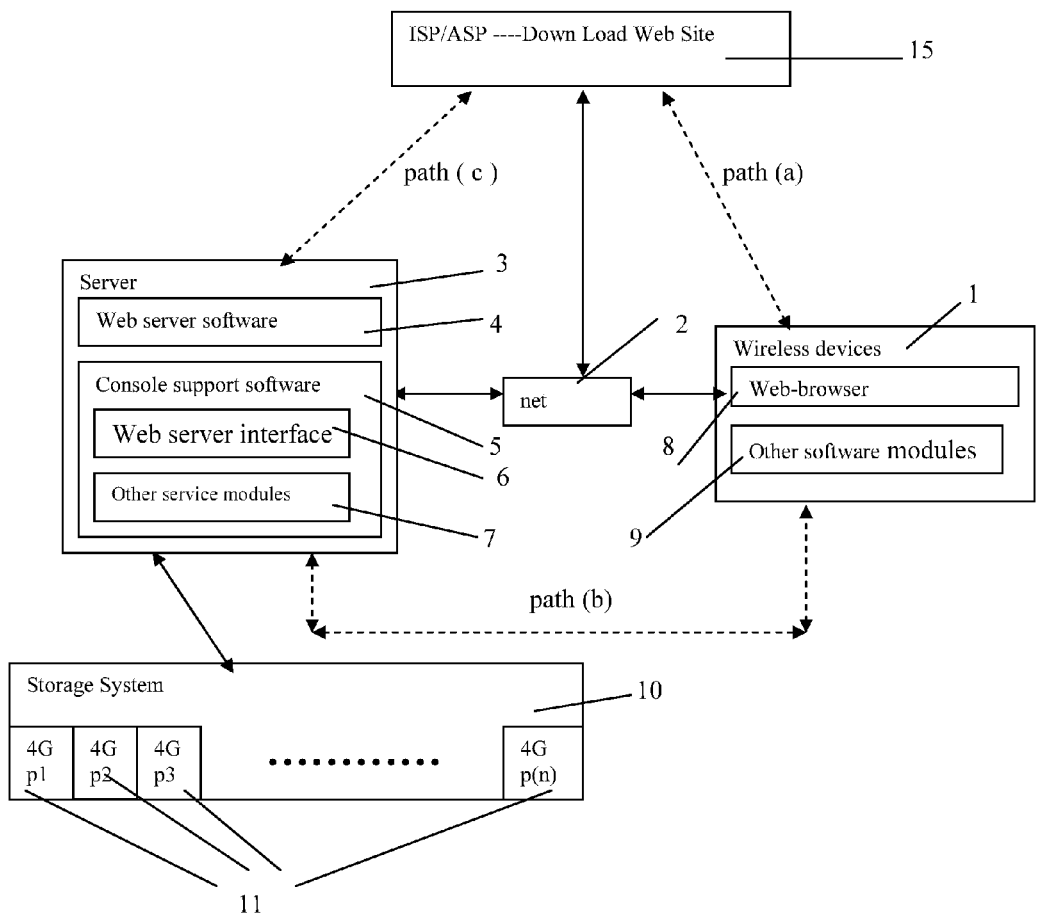
Figure 4:
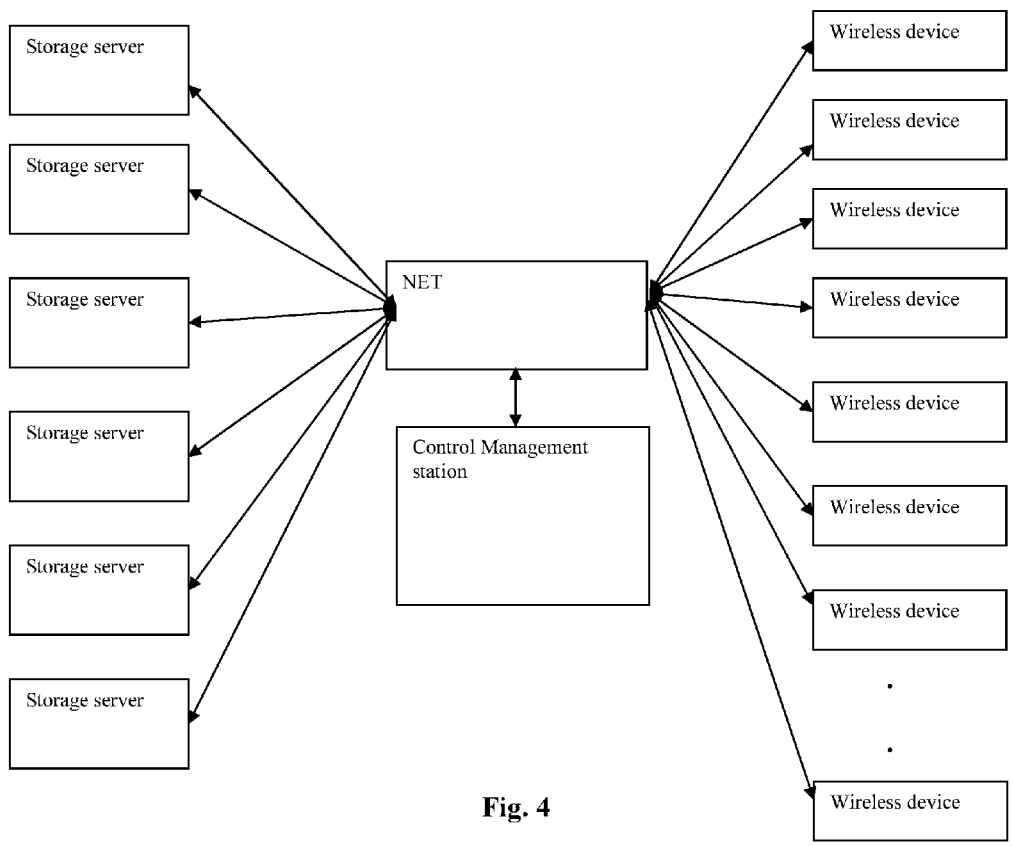
Figure 5:
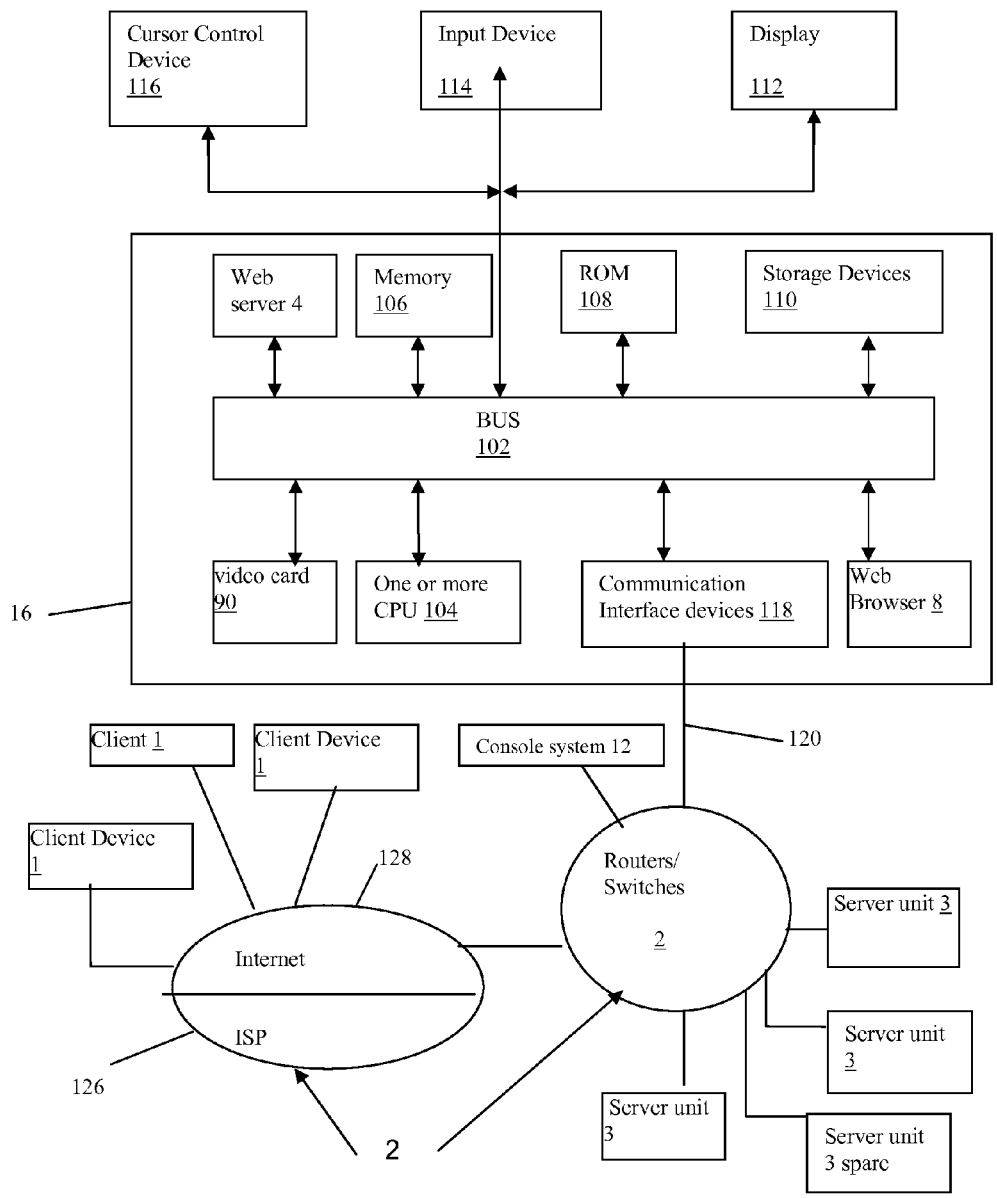

FIG. 3 has demonstrated that a user from a web-browser (8) on a wireless device (1) can download data from a known web-site (15) to his/her assigned external storage (10) on the server (3). The dash-lined path (a) represents a communication channel between the wireless device (1) and a remote download web-site (15) that provides downloading contents. The dash-lined path (b) represents a communication channel between the wireless devices (1) and the storage server (3). The dash-lined path (c) represents a communication channel between the server 3 and the remote web-server (15).

THE DETAILED DESCRIPTION OF THE INVENTION

The Use of the External Storage by the Wireless Device:
The FIG. 2 shows a simplified diagram of the wireless devices (1) using the external storage system (10) of [the server (3) for effectively resolving the storage limitation problem for the wireless devices (1).

Partition Storage Volumes (FIG. 2)
With this invention, the entire storage (10) on the server (3) needs to be partitioned into suitable size of volumes (11) such as 4 GB for each volume. This will allow the server 3 to serve maximum number of the wireless devices (1). With the web console support software (5) of the server (3), tasks of partitioning the storage system (10) can be done through a web-console (13) on a console host (12) by an administrative staff.

In order to support storage partition, first the console support software (5) of the server (3) must send storage information of the server (3) to the web-console (13) of the console host (12). The storage information includes each storage device's name and total size etc. Second, based on the received storage information the administration staff on the console host (12), for example, can use a web-console (13) to partition each storage device and send the storage partition information to the console support software (5) of the server (3). The storage partition information includes the number of the partitions (volumes) and the size of each partition (volume). Third, upon receiving the storage partition information from the web-console (13) of the console host (12), the console support software (5) of the server (3) performs the actual storage partition by dividing the entire storage into multiple small volumes. Finally, for each small storage volume, a corresponding file system could be built up.

Assign Storage Volumes (FIG. 2)
Each of the storage volumes (11) together with its corresponding file system on the storage system (10) of the server (3) needs to be exclusively assigned to a user of a specific wireless device (1) by the console support software (5) of the server (3).

Data and Storage Volume Management (FIG. 2)
With the support of the console support software modules (5) of the server (3), the user of the wireless device (1) can utilize the web-browser 8 illustrated in FIG. 2 to setup folder/directory structure on the file system of his/her assigned external storage volume (11). In addition, the user of the wireless device (1) can use the web-browser 8 performing all data management operations such as delete, copy, move, rename data object etc. on the file system.

In order to support such data management on the external storage (10) assigned to the user of the wireless device (1) by using the web-browser 8, first the console support software modules (5) of the server (3) must communicate with the web-browser (8) of the wireless device (1). Therefore, the user from the web-browser (8) of the wireless device (1) can choose desired data management operations and send information of an operation to the console support software modules (5) of the server (3). The mentioned operation include establishing folder/directory, copying, moving, or reaming data file etc. Second, upon receiving the data management operation, the console support software modules (5) of the server (3) actually performs these requested operation on the assigned file system of an assigned external storage volume (11) on the server (3).

Store Data from Wireless Device into External Storage (FIG. 2)
To store the data such as digital photo pictures or messages into the file system on the assigned storage volume (11) in the server (3), the other software modules (9) of the wireless device (1) need to send these data to the other service modules (7) of the server (3) via communication link between them. Upon receiving the data, the other service modules (7) of the server (3) write these data to the file system of the assigned storage volume (11) for the wireless device 1. The protocol used between these two communication entities could be either IP or non-IP based protocol.

Download Data from a Remote Web Server Site into Allocated Storage Volume:

Now, referring to FIG. 3, If a user of the wireless device (1) wants to download a data from a remote web server (15) into the file system on the assigned storage volume (11) in the external storage system (10) on the server (3), the following steps are required:

1) The user of the wireless device (1) via a web-browser (8) access to a remote web server site (15) to obtain information of the data for the downloading via path (a) of FIG. 3. For example, the user access to a web-page which contains the data name for the downloading.

2) The other software modules (9) of the wireless device (1) obtain the downloading information for the data, which becomes available in the cached web-pages on the wireless device (1) after the web-browser (8) access to the web site (15).

3) The other software modules (9) of the wireless device (1) send the obtained downloading information to other service modules (7) of the storage server (3) via path (b) of FIG. 3.

4) Upon receiving the downloading information from the wireless device (1), the other service module (7) of the storage server (3) sends a web download request to the web-site (15) via path (c) of FIG. 3 based on download information obtained. and receives the downloading data streams from the web server of the web-site (15).

5) Upon receiving downloaded data streams, the other service modules (7) of the storage server (3) write the data streams into the file system of the assigned storage volume (11) in the server (3) for the wireless device (1).

Retrieve Data from Assigned Storage Volume for the User of the Wireless Device

1) If a web-browser (8) on a wireless device 1 has embedded video or music functionality, a user of the wireless device (1) can use the browser to retrieve and play multimedia data file such as video or music stored in the assigned storage volume (11) located on the server (3).

2) In another embodiment, in respect to the user's needs, the other software module (9) of the wireless device (1) also can retrieve data file from the file system of the assigned storage volume (11) on the server (3).

Support External Storage for a Large Number of the Wireless Devices

If there is a need to provide each user a 2 GB of storage space, then a 160 GB disk drive can support 80 users. A 4096 GB (4 Tera Bytes) storage system on the server unit can support 2024 user. Each of the server units only can efficiently support a limited size of the storage system. In order to support a large number of the wireless devices, such as for 500,000 wireless devices, a larger number of the servers is required, in this case 250 servers is required. In order to let a larger number of the servers to effectively support the larger number of the wireless devices, an infrastructure like CCDSVM is desirable, which has been described in prior patent applications. With the CCDSVM the control management station can control larger number of storage servers to provide external storage for a huge number of the wireless devices.

The invention claimed is:

1. A wireless device comprising:
at least one cache storage, one wireless interface, and program code configured to cause the wireless device to:
establish a wireless link for the wireless device access to a storage space of a predefined capacity assigned exclusively to a user of the wireless device by a storage server, and
couple with the storage server across the wireless link to carry out a requested operation for remote access to the assigned storage space in response to the user from the wireless device performed the operation,
wherein the operation for the remote access to the assigned storage space comprises storing a data object therein or retrieving a data object therefrom, the storing of a data object including to download a file from a remote server across a network into the assigned storage space through utilizing download information for the file stored in said cache storage in response to the user from the wireless device performed the operation for downloading the file from the remote server into the assigned storage space.

2. The wireless device as recited in claim 1, wherein the data object, being stored into or retrieved from the assigned storage space, comprises a message or multimedia data of video, digital music, or digital picture.

3. The wireless device as recited in claim 1, wherein the storage server controls a plurality of storage devices, one of the storage devices being configured with the storage space assigned exclusively to the user.

4. The wireless device as recited in claim 1, wherein said downloading a file from a remote server further comprises:
obtaining downloading information for the file;
transmitting the downloading information cached in the wireless device to the storage server; and
causing the storage server in accordance with the downloading information to download the file into the assigned storage space.

5. The wireless device as recited in claim 1, wherein the wireless device further is one of a cell phone or a personal data assistant and management device ("PDA").

6. The wireless device as recited in claim 1, wherein said operation for remotely access to the assigned storage space further comprises:
from the wireless device creating a folder structure in the assigned storage space.

7. The wireless device as recited in claim 1, wherein said operation for remotely access to the assigned storage space further comprises:
from the wireless device deleting or moving or copying or renaming a folder in the assigned storage space.

8. The wireless device as recited in claim 6, wherein said operation for remotely access to the assigned storage space further comprises:
from the wireless device deleting or moving or copying or renaming a file in the assigned storage space.

9. The wireless device as recited in claim 1, wherein wireless device further executes a web browser for the user access to the assigned storage space, access to Internet.

10. The wireless device as recited in claim 6, wherein said operation for remote access the assigned storage space further comprises:
from the wireless device creating a folder in the assigned storage space.

11. A non-transitory computer-readable medium comprising program code that, being executed by a wireless device, causes the wireless device to:
establish a wireless link for the wireless device access to a storage space of a predefined capacity assigned exclusively by a storage server to a user of the wireless device;
couple with the storage server through the wireless link to carry out a requested operation for remote access to the assigned storage space in response to the user from the wireless device performed the operation, wherein the operation for the remote access to the assigned storage space comprises storing a data object therein or retrieving a data object therefrom, the storing of the data object including to download a file from a remote server on a network into the assigned storage space through utilizing download information for the file stored in a cache storage of the wireless device in response to the user from the wireless device performed the operation for downloading the file from the remote server into the assigned storage space.

12. The non-transitory computer-readable medium as recited in claim 11, wherein the program code causes the wireless device, in response to said downloading of a file, obtaining downloading information for the file, transmitting the downloading information cached in the wireless device to the storage server, and causing the storage server in accordance with the downloading information to download the file into the assigned storage space.

13. The non-transitory computer-readable medium as recited in claim 11, wherein the program further causes the wireless device coupling with the storage server to carry out an operation for remotely deleting, moving, copying, or renaming a folder in the assigned storage space.

14. The non-transitory computer-readable medium as recited in claim 11, wherein the program code further causes the wireless device coupling with the storage server to carry out an operation for remotely creating a folder structure in the assigned storage space.

15. The non-transitory computer-readable medium as recited in claim 14, wherein the program code further causes the wireless device coupling with the storage server to carry out an operation for remotely creating a folder in the assigned storage space.

16. The non-transitory computer-readable medium as recited in claim 11, wherein said data object being stored in or retrieved from the assigned storage space is one of a message or multimedia data of video, digital music or digital picture.

17. The non-transitory computer-readable medium as recited in claim 13, wherein the program code further causes the wireless device coupling with the storage server to carry out an operation for remotely deleting, moving, copying, or renaming a file in the assigned storage space.

18. The non-transitory computer-readable medium as recited in claim 11, wherein the program code further causes the wireless device executing a web browser through which the user access to the assigned storage space, and access to Internet.

19. The non-transitory computer-readable medium as recited in claim 11, wherein the wireless device further is one of a cell phone or a personal data assistant and management device ("PDA").

20. The non-transitory computer-readable medium as recited in claim 11, wherein the storage server controls a plurality of storage devices, one of the storage devices configured with the storage space assigned exclusively to the user.

* * * * *

UNITED STATES PATENT AND TRADEMARK OFFICE
CERTIFICATE OF CORRECTION

| | | |
|---|---|---|
| PATENT NO. | : 9,098,526 B1 | Page 1 of 1 |
| APPLICATION NO. | : 14/150106 | |
| DATED | : August 4, 2015 | |
| INVENTOR(S) | : Tsao | |

It is certified that error appears in the above-identified patent and that said Letters Patent is hereby corrected as shown below:

In the Specification
1) In col. 2, line 42, please replace the "volume" with --- volumes ---;
2) In col. 3, line 65, please replace "[the" with --- the ---;

In the Claims
3) In col. 6, line 52, please replace the "Internet" with --- the Internet ---;
4) In col. 7, line 5, please replace the "on a" with --- across a ---;
5) In col. 7, line 21, please replace the "program" with --- program code ---;
6) In col. 6, line 4, line 12, and line 67, and col. 7, line 8, please replace "performed" with --- performing ---.

Signed and Sealed this
Twenty-ninth Day of March, 2016

Michelle K. Lee
*Director of the United States Patent and Trademark Office*